Edward L. Crosby, Jr.
INVENTOR.

BY Michael P. Breston
AGENT

Edward L. Crosby, Jr.
INVENTOR.

BY Michael P. Breston
AGENT

United States Patent Office 3,257,848
Patented June 28, 1966

3,257,848
TEMPERATURE TRANSDUCERS FOR VERY HIGH TEMPERATURE MEASURING SYSTEMS
Edward L. Crosby, Jr., Siesta Key, Sarasota, Fla., assignor to Electro-Mechanical Research, Inc., Sarasota, Fla., a corporation of Connecticut
Filed Dec. 28, 1961, Ser. No. 162,831
5 Claims. (Cl. 73—362)

This invention relates to methods, pyrometers, and systems for measuring the ambient temperature of hot media and more particularly to methods, pyrometers, and systems based on the electron emission by refractory electrodes arranged in heat-transfer relationship with said media.

In many diversified fields, as in the development of vehicles for outer space flights, there is a growing need for simple and rugged pyrometers and systems capable of automatically recording or displaying the temperatures of preselected critical check points within the frame of the vehicle. The significance of automatic temperature recordings or displays can be readily appreciated from the fact that, to prevent the vehicle's disintegration from excessive heat, the speed and direction of the vehicle are planned by the astronaut in reliance upon the displays so as to prevent the craft's leading edges from exceeding their maximum-allowable "safe" temperature limits.

Known systems for recording temperatures based, for example, on the change of electric resistance, as of a platinum wire, on the production of a thermoelectric current, as by a platinum-iridium couple, on the expansion of gases or vapors, or on the specific heat of solids are generally unsuitable because of the imposed high-operating temperature range.

Systems which are capable of measuring very high temperatures, as radiation or optical pyrometers, although extremely useful in laboratory-type environments, become highly unpractical when required to perform under the very severe operating requirements of spacecrafts.

Prior art pyrometric systems and methods were found undesirably limited, in general, in one or more of the following respects: (1) unsuitable for very high temperatures, (2) produce low signal levels and high noise-to-signal ratios, (3) require relatively high operating power, (4) unadaptable to grounded electric systems, (5) unadaptable for pulse energization, (6) require numerous time-consuming manipulative steps, (7) difficult to implement, (8) yield results which are relatively difficult to interpret, and (9) require highly expensive instruments, as for measuring the intensity of radiation or light, which are too bulky, heavy, and fragile.

Accordingly, it is a general object of this invention to provide new and improved pyrometric transducers and systems which largely overcome the foregoing and other apparent shortcomings of the prior art.

It is another object of this invention to provide new and improved pyrometric transducers and systems which are capable of providing high signal levels, which require low operating power, which can be pulse operated, which are suitable for operation with grounded systems, which can efficiently operate under severe physical environmental conditions, as under shock, vibration, excessive magnetic fields, etc., and which provide reliable temperature indications over their entire operating range.

It is yet another object of this invention to provide new and improved high-vacuum temperature transducers which are simple and robust, which are relatively inexpensive to manufacture, and which are readily adaptable to measure the temperature of leading edges of aerodynamic surfaces.

This invention makes use of a well-known phenomenon, namely, the electron emission from heated metals, known as thermionic emission. When a suitable metal is heated in an evacuated chamber, the kinetic energy of its electrons increases. If its temperature is raised sufficiently, some electrons are enabled to surmount the confining surface potential energy barrier and escape. The escape is facilitated by the establishment of a strong electric field, as by a positively charged electron collector electrically connected to the heated metal through an external circuit.

The magnitude of the resulting current flow in the external circuit is related, among other things, to the temperature of the metal. If the electron emitter (cathode) is prevented from undergoing any markable transitions of state and further if the positive potential on the electron collector (anode) is raised to a value large enough to collect all the electrons emitted, then, the resulting thermionic current flow under these conditions is depicted as the "saturation" current. A diode whose collector receives saturation current is said to be operating under temperature-limited conditions.

Although Richardson and later Dushman have suggested methods for determining the magnitudes of the thermionic emission, in practice however, it is extremely difficult to find an exact mathematical relation between the electron emitter's temperature and the flow of current in the anode-cathode circuit. Relatively recent investigations tend to indicate that the electron emission does not take place uniformly over the metal's surface. The emission depends, among other things, on the type of crystal face exposed, on the electron velocity distribution, and on the diode's geometrical configuration. Consequently, it will be readily appreciated that the desired relation between the emission current and the emitter's temperature may be best established empirically for each type of transducer employed. The required experimental calibrations can be readily accomplished by the use of conventional laboratory-type pyrometers.

For example, the temperature of the emitter may be obtained with the aid of an optical pyrometer. This instrument utilizes the ability of the human eye to match the brightness of the emitter's image, at a given wavelength of light, to the image of a calibrated filament in the instrument. Inasmuch as the brightness varies much more rapidly than the measured temperature, this method yields accurate results. It must be noted, however, that, because the brightness of a surface depends not only upon its temperature but also upon its spectral radiation emissivity at a given wavelength, this emissivity must be properly taken into account when interpreting the pyrometer's indications. Inasmuch as the atmospheric composition changes during the vehicle's reentry, an appreciable and not yet fully known effect on the emissivity of the electron emitters within the reentry body takes place. Thus, if optical pyrometers were employed in spacecrafts, their temperature indications would be difficult to interpret.

As previously mentioned, if the diode is operating under temperature-limited conditions, the current in its external anode-cathode circuit is limited principally by the amount of its thermionic emission: the greater the temperature of the emitter, the greater the external current. A voltage drop occurs across the diode while current is conducted therethrough thereby causing a power loss in the diode which has, at least, a double disadvantage: it drains the generally limited power supply available on board of space vehicles, and it results in the heating of the anode. To reduce the power consumption and to maintain the anode's electron emission negligible relative to the cathode's electron emission, the diode's temperature should be only periodically sampled; i.e., the diode should be allowed to conduct current only during very short time intervals.

On the other hand, the power loss allows the diode to be considered as a load whose resistance varies with temperature. Thus, suitable resistance measuring systems can be adapted to provide accurate measurements of temperature. Obviously, the cathode's temperature may also be found by measuring the magnitude of the current in the anode-cathode circuit or by measuring the anode-to-cathode voltage drop.

When it is desired to monitor a spacecraft's temperatures, a suitable measuring system for employing the high-vacuum diodes, in accordance with this invention, provides a visual record to the astronaut of the respective diodes' resistance (and hence, temperature) values, the diodes being suitably placed at the vehicle's critical points, as at the leading edges of the aerodynamic surfaces. To minimize the power loss in the diodes, their temperatures are only periodically sampled, as by detecting the amplitude modulations imposed on recurrent pulses applied to the diodes' respective anodes.

From the foregoing it will apparent to a man skilled in the art that this invention can be variously implemented depending upon the operating temperature range, the geometrical configuration of the structure whose temperature it is desired to record, the surrounding physical environmental conditions, the sensitivity and accuracy of the required temperature recordings, the choice of available critical materials, the sealing and vacuum techniques employed, etc.

Consequently, it is to be expressly understood that the following detailed description of some exemplary embodiments of the high-temperature diode in accordance with the invention is for the purpose of illustration and description only and is not to be construed as defining the limits of the invention.

The objects and advantages of the invention will appear more fully hereinafter from a consideration of the detailed descripiton thereof taken in conjunction with the accompanying drawing, wherein.

Figure 1:
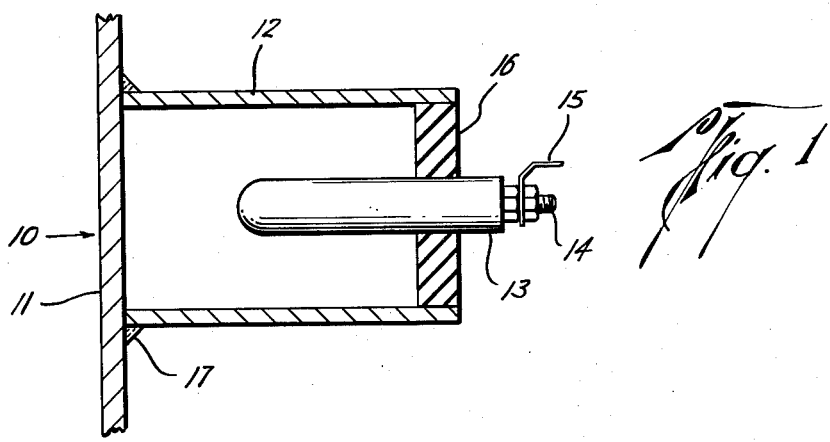
FIG. 1 is a high-temperature diode in accordance with this invention especially adapted for flush installations.

In FIG. 1 there is shown a high-vacuum temperature transducer, generally designated with the numeral 10, especially adapted for flush installations, as for recording the temperature of a space vehicle's wing skin. The transducer 10 includes: a cathode base 11, preferably of the same material and thickness as the wing skin; an envelope or shell 12 of any suitable geometrical form, as of cylindrical shape, serving as an electron emitter or cathode; an electron collector or anode pin 13 of any convenient cross section, preferably having a threaded terminal 14 for receiving an electric conductor 15; and, an insulating sleeve 16 braze-jointed to the cathode 12 and the anode 13 for supporting and electrically insulating the anode pin from the envelope 12. The brazing is preferably made with pure platinum in order to withstand high temperatures and to provide a good vacuum seal. To form a tightly sealed joint between the metals of base 10 and of cathode 12, known welding methods, for example, butt or lap welding, may be employed, as at 17.

The diode 10 may be assembled in vacuo or at ambient pressure. To create a high-vacuum diode in which the gas pressure is so low that it has no appreciable effect on its operation, thorough outgassing, as by baking at a greatly reduced pressure, is required.

Because the diodes in accordance with the invention are especially suitable for measuring high temperatures, the metals used in the diode must be refractory, that is, sufficiently hard and physically stable at the operating temperatures. Suitable metals are hafnium (melting point 2473° K.), molybdenum (M.P. 2833° K.), rhenium (M.P. 3713° K.), tantalum (M.P. 3123° K.), and tungsten (M.P. 3660° K.). The optimum practical operating temperature to which a thermionic emitter can be subjected is the highest temperature consistent with a rate of metal evaporation that yields a reasonable life for the emitter. This rate usually becomes excessive at a temperature considerably below the metal's melting point. Pure tantalum and tungsten, for example, because of their low vapor pressures and high melting points, can be operated at sufficiently high temperatures yet providing adequate operating lives. Tantalum, however, is not well suited as an electron emitter because of its tendency to become brittle as a result of recrystallization into large crystals when exposed to high temperatures.

From among the other known pure refractory metals, pure tungsten is generally preferred for the electron emitter. An outstanding advantage of tungsten lies in the fact that when bombarded by positive ions resulting from the unavoidable small amount of residual gas within the diode 10, it is relatively much less subject to loss of its electron emitting properties. However, although the emission from tungsten is not substantially impaired by the presence of mercury vapor and the noble gases, as neon, helium, argon, krypton, and xenon, it is affected by other gases, especially nitrogen and water vapor. In sum, the highest temperature measurable is limited by the softening temperature of the most refractory metal employed for the electron emitter and by the highest temperature ceramic insulation material used for the sleeve 16.

To measure relatively lower temperatures of say, 1500–2500° F., the electron emitter may be made of thoriated tungsten which is usually carbonized for greater mechanical stability. At a temperature of 1800° F. an emission current of approximately 0.1 milliampere per square centimeter is available. At lower temperatures, thoriated tungsten is preferred over pure refractory metals because of its relatively lower work function at such temperatures.

Since for accurate measurements it is desired that the electron emission from the anode should be negligible compared to the electron emission from the cathode, the anode material should have a low vapor pressure, a high work function, and be kept at a temperature substantially lower than that of the cathode. The anode pin 13 may be made of molybdenum coated with platinum: the molybdenum base is chosen for its relatively high melting point; the platinum coating is desirable for its chemical inertness and compatibility with a platinum braze. Also, platinum has a sufficiently high work function to prevent the anode from emitting an appreciable quantity of electrons at a temperature equal to or lower than the temperature of the cathode.

Other refractory metals may be employed as the base material for anode 13; consideration however must be given to the compatibility of the material with the ceramic insulator sleeve 16. The insulating sleeve 16 is preferably made of high-resistivity, refractory ceramics, such as Pyroceram (manufactured by Corning Glass Works), and Berlox $BeO_2$ (manufactured by National Beryllium Corporation). Such ceramics have a specific resistivity of approximately $4 \times 10^4$ ohm/cm. at 2900° F.

Since in a typical operation of the high-temperature diode the cathode is maintained at structure (ground) potential, only a single wire 15 need be connected to terminal 14 to complete the anode-to-cathode circuit. Adequate wire insulation must be provided because of the decrease in the resistivity of most dielectric materials at elevated temperatures. Refractory ceramic dielectrics can be used to make insulating and supporting beads for the electric conductor 15.

Figure 2:
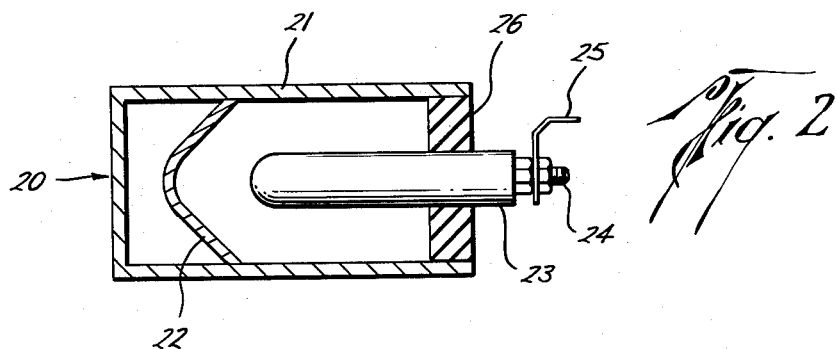
FIG. 2 is another embodiment of a high-temperature diode best suitable for recording ambient temperatures.

In FIGURE 2, the high-temperature measuring diode 20 includes an outer envelope or shell 21 of any suitable geometrical form, as of rectangular or circular cross section. Near the bottom of envelope 21 is jam-fitted, to assure a good thermal bond, an electron emitting slug 22. The envelope's open end is again provided with an anode pin 23 fixedly supported by a braze-jointed ceramic insulating sleeve 26. The anode pin 23 is threaded at one end 24 thereof for detachably supporting a ceramic insulated conductor 25.

While the envelope 21 and the slug 22 may be made of the same refractory metal and, therefore, their combined electron emission would then contribute to the diode's external current, it is often more desirable to make them of dissimilar refractory metals. For example, should it be desired that the electron emission from the envelope 21 be negligible compared to that from the slug 22, the refractory metals would then be selected on the basis of their work functions: the work function of the metal employed for the envelope would be relatively much higher than that of the slug. Thus, envelope 21 can be made of a structurally sound refractory metal, as of molybdenum or tungsten, whereas slug 22 can be of thoriated tungsten, which is characterized by a relatively low work function. It will be appreciated that the diode of FIG. 2, if constructed of dissimilar metals as above indicated, will yield a relatively large operating temperature range since the slug 22, having a low work function, will emit appreciable quantities of electrons, at relatively low temperatures, even when the electron contribution of the envelope 21 is small or negligible. In all other respects, diode 20 of FIG. 2 is similar to diode 10, shown in FIG. 1.

Figure 3:
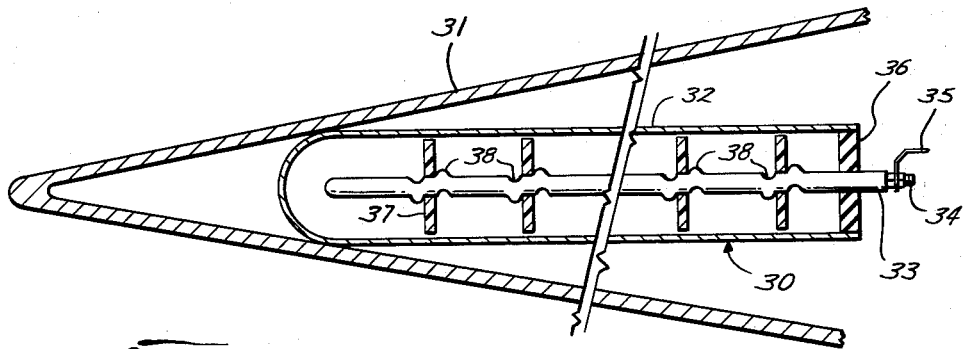
FIG. 3 is yet another embodiment of a high-temperature diode which can be inserted conveniently within leading edges of aerodynamic surfaces.

In FIG. 3 is shown a narrow, elongated diode 30, particularly suitable for measuring the temperatures of leading aerodynamic edges, such as edge 31. The electron-emitting shell 32 of diode 30 is, preferably, in the form of a long, narrow tube inside of which is housed an electron collector in the form of a thin rod 33. To insulate anode 33, under dynamic operating conditions, from the shell 32, the anode is made to loosely carry a plurality of suitably spaced, light-weight beads 37. The beads are made of a refractory insulating material, as of ceramic or mica. They are retained in place by crimps 38 conveniently formed along the length of the anode rod 33, as shown. The open end of the elongated shell 32 is terminated by a brazed, insulating sleeve 36, in a manner previously explained in conjunction with FIGS. 1 and 2.

An obvious advantage gained from making the cathode shell 32 in the form of an elongated tube is that the insulating sleeve 36 and, consequently, the diode's sealing joint may be secured to the vehicle's structural frame whose temperature is generally much lower than that of the leading edge 31. The choice of the refractory metals employed to construct diode 30 is dictated by the desired operating temperature range, as previously explained with reference to diode 10.

Figure 5:
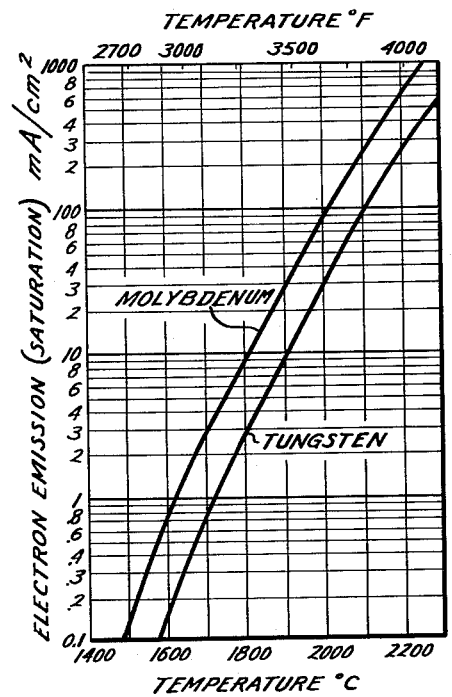
FIG. 5 shows current-versus-temperature curves for typical refractory metals.

In FIG. 5 are shown graphs of electron emission versus temperature for two typical refractory metals, tungsten and molybdenum. It can be readily seen that as the temperature varies from 2700° F., to 4100° F., the electron emission increases approximately by a factor of $10^4$. At the higher operating range, in the neighborhood of 4100° F., the electron emission is approximately 1 ampere per square centimeter. Thus, even reasonably sized diodes would provide, at the higher operating temperatures, relatively high currents to the diodes' external anode-to-cathode circuits if continuous direct current potentials were applied to the electron-collector electrodes. As a result, continuous D.C. operation, which would require unreasonably large power supplies, is to be avoided.

Preferably, therefore, the diodes should be pulse operated. In addition to avoiding large power dissipation in the diodes, pulse operation permits A.C. coupling in the measuring system with the inured advantage of freedom from D.C. drift. Another noteworthy advantage gained from pulse operation is that the power dissipated in the diode can be maintained at a minimum level thereby providing more accurate temperature calibrations, inasmuch as the electrically induced heat in the diode will be negligible compared to the heat induced therein by the object whose temperatures it is desired to measure.

Figure 4:
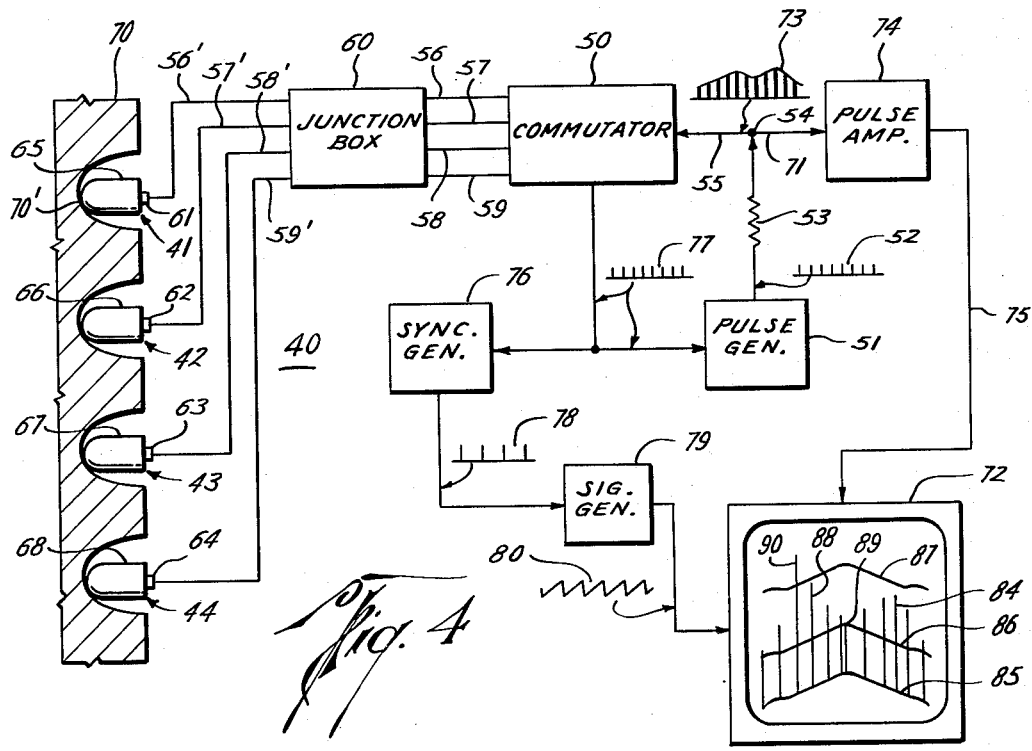
FIG. 4 is a block-diagram of a preferred temperature measuring system in accordance with this invention.

The preferred temperature measuring system, generally designated as 40, is shown in FIG. 4. For purposes of illustration and to simplify the drawing, it includes only four high-temperature diode transducers 41–44 of the typical types described and illustrated with reference to FIGS. 1 and 3.

To periodically sample the temperature of diodes 41–44, a pulse generator 51 supplies relatively high voltage pulses 52 to a high-valued resistor 53, which is connected to junction 54 on line 55. Commutator 50, which may be of either the mechanical or the electronic type, sequentially connects line 55 to each of insulated lines 56–59. Lines 56–59 are fed to a suitable junction box 60 in which they are electrically connected to their corresponding mating lines 56′–59′. Since the physical integrity of the insulated conductors 56′–59′ must be maintained even at the highest encountered operating temperatures, the wires should be made of a suitable refractory metal, as of tantalum or molybdenum, and they should be insulated from ground with the aid of refractory ceramic beads made, for example, of Berlox. Thus, it will be appreciated that the function of the junction box 60 is to decrease the amount of required ceramic insulated wire. Lines 56′–59′ are respectively connected to the anodes 61–64 of diodes 41–44, conveniently placed adjacent to predetermined critical locations in the structure 70 whose temperatures it is desired to measure.

The diodes' envelopes or cathodes 65–68 are attached to the heated structure 70 which forms a return path (ground) for the electrical currents. The attachments, as shown at 70′, may be made by welding, clamping, or in any other suitable manner so as to provide, in addition to grounded terminals, a means for conducting the heat from the structure 70 to the temperature measuring diodes 41–44.

Line 55 is also connected via line 71 to a suitable measuring or recording device, as to a cathode-ray tube 72 for recording the amplitudes of the pulses 73 appearing on junction 54. If required, a pulse amplifier 74 may be inserted between junction 54 and the recording device 72. Line 75 feeds the output of pulse amplifier 74 to the vertical deflection plates of indicator 72.

To synchronize the operation of the pulse generator 51, the commutator 50, and the cathode-ray tube 72, synchronizing means, such as a synchronous generator 76, is employed. The synchronous generator 76 provides a fine pulse train 77 and a coarse pulse train 78. The former consists of a series of trigger pulses, one for each diode, which are so timed that a complete set of these pulses, i.e., a number equal to the number of employed diodes, occurs in the time interval between the occurrence of two coarse pulses in train 78. The fine pulse train 77 is applied to commutator 50, in order to synchronize its operation with the remaining components of the system, and to the pulse generator 51, in order to synchronize the occurrence of the high power pulses 52 with the connections made by the commutator 50. Thus, the train of pulses 52 is in synchronism with the fine train of pulses 77. The coarse pulse train 78 is applied to a signal generator 79 which drives the horizontal deflection plates of the cathode-ray oscilloscope 72. A typical output wave from signal generator 79 may consist of linear voltage ramps 80, the duration of each ramp being determined by the interpulse period in the wave train 78.

In operation, as previously explained, each of the temperature measuring diodes 41–44 presents to the measuring system 40 an impedance load, the magnitude of which is primarily dependent upon the temperature of its electron-emitting surface or cathode. For example, at a temperature of 1500° F. the cathode's resistance may be on the order of 120,000 ohms per square centimeter;

whereas at a temperature of 4000° F. its resistance may be as low as 3700 ohms per square centimeter.

Thus, in effect, the high-valued resistor 53 and the impedance of each diode (which is periodically connected by commutator 50 in series with resistor 53) form a voltage divider for the high-voltage pulses 52 supplied by the pulse generator 51. At the upper end of the operating temperature range, a diode connected by commutator 50 to junction 54 presents a low-value impedance; hence, due to the voltage dividing action, pulse 73 has an amplitude which is only a small portion of the output pulse 52 from generator 51. Inversely, and for the same reason, at the lower end of the operating temperature range, a diode connected by commutator 50 to junction 54 presents a relatively high-value impedance and, as a result, the amplitude of its corresponding pulse 73 is also high.

In sum, since junction 54 is sequentially and periodically coupled by commutator 50 to each of the measuring diodes 41–44, the train of pulses 73 on line 55 is amplitude modulated. The envelope defined by the peak amplitudes of pulses 73 contains the desired information relating to the critical temperatures in the aerodynamic surface 70.

The amplitude-modulated pulses 73, after being amplified by the pulse amplifier 74, appear on the face of the visual display indicator 72 as a comb array of vertical lines 84 of varying amplitudes. After consecutively sampling all of the temperature-measuring diodes, the commutator 50 cyclically repeats the process in response to the pulse train 77 from the synchronous generator 76. Each completed set of samples corresponds to one frame or picture on the face of indicator 72.

To facilitate the observation of the temperature measurements, i.e., of the amplitudes of lines 84, illuminated reticles on or in front of the screen of the cathode-ray tube may be provided. The engraving of the reticle lines may be patterned after the shape of the space vehicle. For example, if the space vehicle is in the shape of a capital Greek letter delta, the reticle lines should be as shown on the face of indicator 72.

Reticle line 85 is taken as the base line for the comb array of vertical lines 84. Reticle line 86 is the "hot-limit" line, and reticle line 87 is the "cold-limit" line. Obviously, a frame will contain a number of vertical lines 84 which is equal to the number of deployed temperature-measuring diodes throughout the aerodynamic surface 70. Since in actual practice more than four temperature measuring diodes are distributed, the picture on the face of indicator 72 is purposely shown to contain a plurality of such vertical lines 84, which might typically be observed by the astronaut. Vertical lines 84 have their lower ends fixed to base line 85. The space between the upper reticle lines 86 and 87 is designated as the "safe" area into which the upper ends of vertical lines 84 may fall when indicating normal operating temperatures.

To illustrate, if a vertical line such as 88 were to extend from the base line 85 almost to the upper reticle line 87, it would indicate that the ambient temperature of the diode producing vertical line 88 is relatively cold. Inversely, if a vertical line such as 89 should extend only from the base line 85 to the middle reticle line 86, it would indicate that the diode producing vertical line 89 has reached its maximum-allowable "safe" temperature. Finally, if a vertical line such as 90 should exceed the upper reticle line 87, it would indicate that the corresponding diode has become defective. The picture, as shown, indicates that the vehicle's "nose" approaches the dangerous temperature limit.

It is thus apparent that the astronaut can, at a glance, determine the temperatures of the leading edges of his vehicle. Such knowledge will enable him to plan his vehicle's trajectory in a manner as to maintain its physical integrity. Alarm systems may, of course, be provided to automatically become responsive when the amplitude of a pulse 73 falls below a predetermined safe threshold level, that is, when a vertical line 84 falls below the "hot-limit" line 86.

Moreover, a study of the current emission versus-temperature curves shown in FIG. 5 will make it apparent that, particularly at the upper end of the operating temperature range, relatively small changes in temperature produce appreciable current changes and, therefore, the temperature measuring diodes, in accordance with this invention, provide highly sensitive indications of those operating temperatures which are especially critical to the space vehicle.

The principles of the invention have been described and illustrated with reference to the measurement of temperatures in space vehicles. Obviously, the invention is not limited to such applications. The temperature-measuring diodes, in accordance with the invention, can measure the temperatures of any suitable objects, liquids, or gases: the heat may be transferred to the diode in any known manner. Moreover, although the temperature-measuring system, shown in FIG. 4, is based upon the measurement of the diode's impedance variations, it could be modified to measure, for example, the diode's power dissipation, output current, voltage, etc., as discussed in greater detail in the foregoing description.

Therefore, changes in the components, units, and assemblies will appeal to those skilled in the art, and it is contemplated that such changes may be employed, but fall within the spirit and scope of the claims that follow.

What is claimed is:

1. A device for measuring the ambient temperature of a very hot medium comprising: a heat-conductive envelope in heat-transfer relationship with said medium, said envelope consisting exclusively of a refractory substance emitting a quantity of electrons as a function of said ambient temperatures, an electron-collecting electrode receiving a positive potential for attracting substantially all of the emitted electrons, and a refractory insulator adapted to maintain said electrode in operative relationship within said envelope.

2. The temperature measuring device of claim 1 wherein said substance is substantially pure tungsten, said insulator is braze-jointed to said envelope and said electrode thereby maintaining a high vacuum within said envelope.

3. The temperature measuring device of claim 2 wherein said envelope is an elongated tube and said collector is a long rod, and further including refractory insulating means carried by said rod within said envelope.

4. A very-high-temperature measuring device comprising: a refractory high-vacuum metallic chamber, a refractory electron collector within said chamber, a support member insulating said collector from said chamber, said chamber being made exclusively of a refractory substance emitting a quantity of electrons in dependence upon the temperature of an external medium heating the outer walls of said chamber, and said collector being adapted to receive a signal of sufficient amplitude to attract said quantity of electrons.

5. The temperature-measuring device of claim 4 wherein said substance is tungsten and said collector is platinum coated.

References Cited by the Examiner

UNITED STATES PATENTS

| 1,860,187 | 5/1932 | Koller | 73—362 X |
| 2,417,459 | 3/1947 | Eitel et al. | 313—355 |
| 2,474,192 | 6/1949 | Schlesman | 73—341 |
| 2,586,291 | 2/1952 | Bender | 313—310 |
| 2,858,471 | 10/1958 | Gillies et al. | 313—355 |

OTHER REFERENCES

Laudee, Davis and Albrecht Electronic Designers Handbook (McGraw-Hill; New York) 1957, pages 2–8 through 2–10.

LOUIS R. PRINCE, *Primary Examiner.*

ISAAC LISANN, R. E. KLEIN, S. H. BAZERMAN,
*Assistant Examiners.*